US011526751B2

(12) United States Patent
Singh et al.

(10) Patent No.: US 11,526,751 B2
(45) Date of Patent: Dec. 13, 2022

(54) METHOD AND SYSTEM FOR GENERATING A DYNAMIC SEQUENCE OF ACTIONS

(71) Applicant: Verizon Patent and Licensing Inc., Arlington, VA (US)

(72) Inventors: Sumit Singh, Irving, TX (US); Balagangadhara Thilak Adiboina, Hyderabad (IN); Adithya Umakanth, Hyderabad (IN); Ganesh Narasimman, Chennai (IN); Sambasiva R Bhatta, Tampa, FL (US); Anurag Pant, New City, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 498 days.

(21) Appl. No.: 16/694,891

(22) Filed: Nov. 25, 2019

(65) Prior Publication Data
US 2021/0158146 A1    May 27, 2021

(51) Int. Cl.
*G06N 3/08* (2006.01)
*G06N 3/04* (2006.01)
*G06Q 30/00* (2012.01)

(52) U.S. Cl.
CPC ............ *G06N 3/08* (2013.01); *G06N 3/0445* (2013.01); *G06N 3/0454* (2013.01); *G06Q 30/016* (2013.01)

(58) Field of Classification Search
USPC ............................ 704/202, 232, 259; 706/12
See application file for complete search history.

(56) References Cited

U.S. PATENT DOCUMENTS

| | | | |
|---|---|---|---|
| 11,004,005 B1 * | 5/2021 | Sirois | G06N 5/045 |
| 11,140,738 B1 * | 10/2021 | Rane | H04W 76/19 |
| 2018/0211260 A1 * | 7/2018 | Zhang | G06N 20/00 |
| 2019/0318204 A1 * | 10/2019 | Mishra | G06Q 10/0631 |
| 2020/0074476 A1 * | 3/2020 | Ellison | G06N 3/088 |
| 2021/0012239 A1 * | 1/2021 | Arzani | G06N 20/00 |
| 2021/0014136 A1 * | 1/2021 | Rath | G06N 20/20 |

* cited by examiner

*Primary Examiner* — Leonard Saint-Cyr

(57) ABSTRACT

A device may receive historical data and real-time data associated with a troubleshooting service, identify, using a machine learning model, an optimal resolution based on the historical data and the real-time data, and identify, using a graph analytics model, an optimal path of actions based on the optimal resolution. The machine learning model may be trained to identify one of the set of historical issues associated with the unresolved issue, and identify the optimal resolution based on one of the set of historical resolutions associated with the one of the set of historical issues. The graph analytics model may be trained to generate a set of paths of actions based on the historical data, and identify the optimal path based on respective numbers of actions associated with the set of paths. The device may identify optimal action based on the optimal path and the prior action.

20 Claims, 7 Drawing Sheets

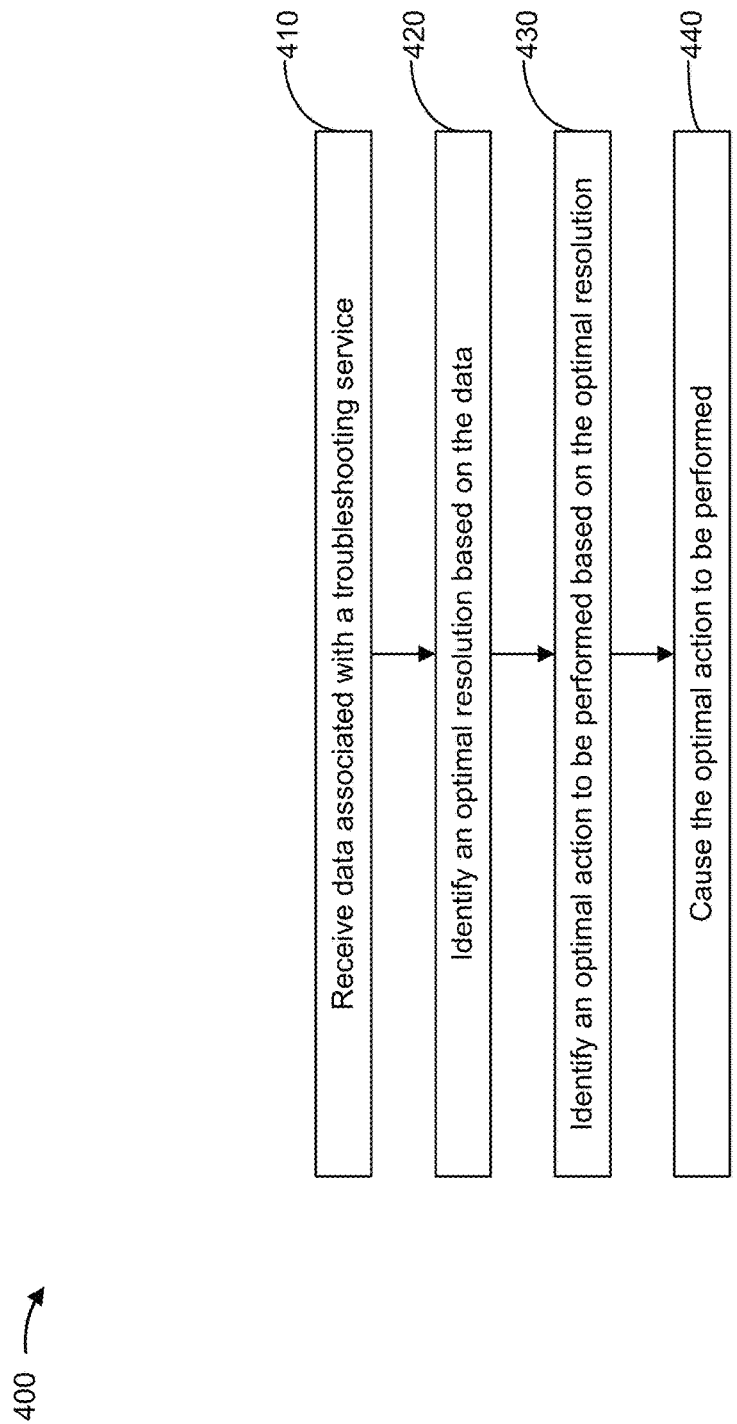

METHOD AND SYSTEM FOR GENERATING A DYNAMIC SEQUENCE OF ACTIONS

BACKGROUND

A contact center (e.g., a call center and/or the like) is a centralized office used for receiving large volumes of inquiries via telephone, chat, and/or another form of communication. A contact center is often operated by a company to administer technical support relating to a product and/or a service for consumers. In some cases, contact centers may utilize cloud-based software as a service (SaaS) platforms, and use application programming interfaces (APIs) to integrate with cloud-based applications to interact with consumers. Developers use APIs to enhance cloud-based contact center platform functionality (e.g., using Computer Telephony Integration (CTI) APIs to provide basic telephony controls and sophisticated call handling, configuration APIs to enable Graphical User Interface (GUI) controls of administrative functions, and/or the like).

BRIEF DESCRIPTION OF THE DRAWINGS

FIG. 4 is a flow chart of an example process for identifying an optimal path of actions of a dynamic sequence.

DETAILED DESCRIPTION OF PREFERRED EMBODIMENTS

Figure 1A:
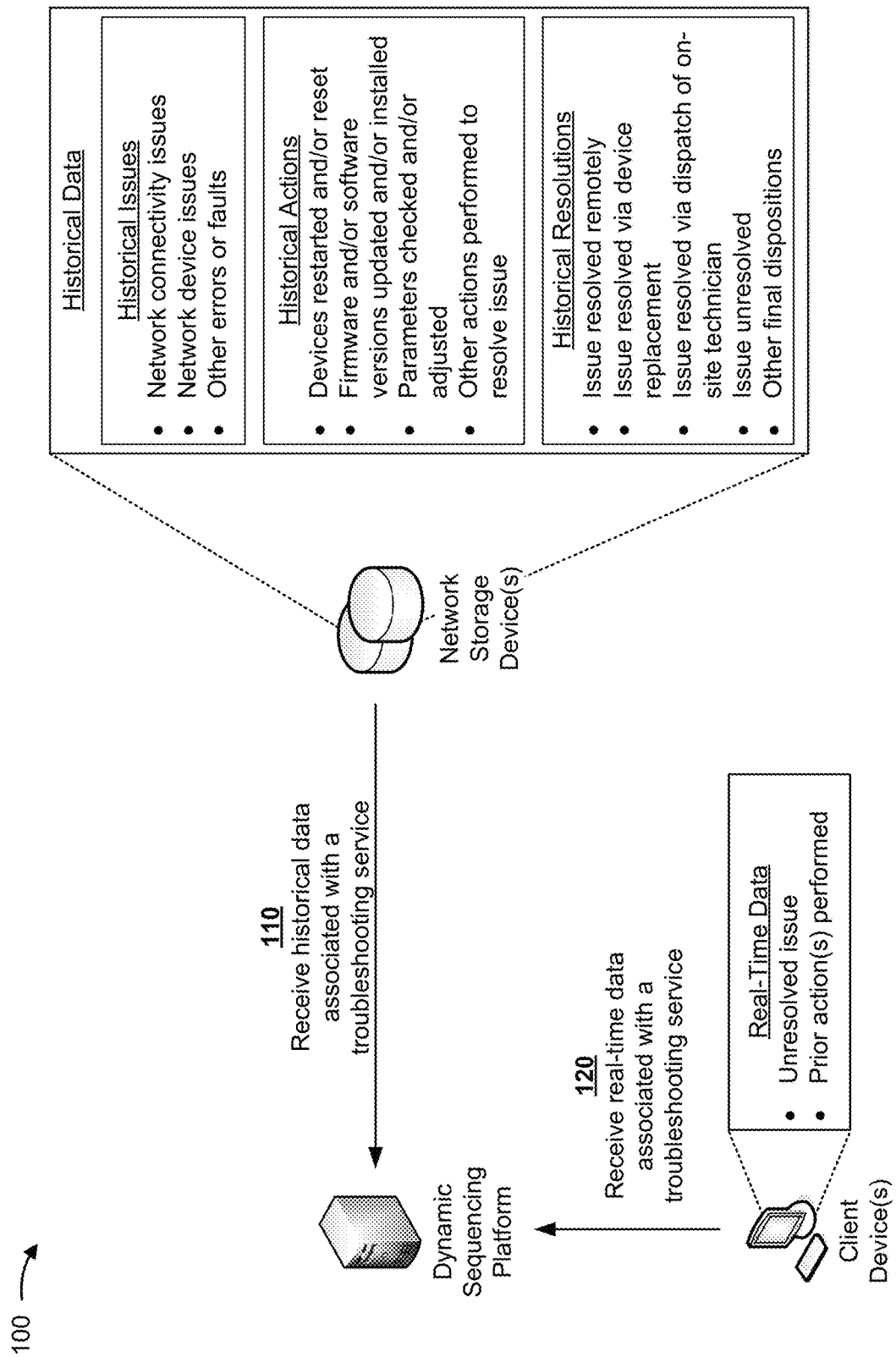
FIGS. 1A-1D are diagrams of one or more example implementations described herein.

The following detailed description of example implementations refers to the accompanying drawings. The same reference numbers in different drawings may identify the same or similar elements.

A contact center (e.g., a call center and/or the like) may receive large volumes of inquiries from consumers (e.g., via telephone, chat, and/or another form of communication) relating to a product and/or a service (e.g., a network device, a network service, and/or the like). The contact center may employ one or more teams of service agents to receive the inquiries from the consumers and respond to the inquiries. In some cases, the inquiries may relate to a technical issue with a product and/or a service, and the service agents may be tasked with assisting the consumers in resolving the technical issue. The service agents may be trained to troubleshoot the technical issue with the consumers according to general guidelines provided by a product manufacturer and/or a service provider. The guidelines may provide a sequence of actions (e.g., troubleshooting steps) that can be performed by the service agents and/or the consumers to identify a cause of the technical issue and/or to resolve the technical issue. For instance, the guidelines may specify an action or a sequence of actions that the service agent can perform remotely from the contact center, an action or a sequence of actions that the service agent can instruct the consumer to perform locally, and/or the like. In some cases, the technical issue may be resolved by performing the actions. In other cases, the technical issue may be resolved by shipping a replacement device, dispatching an on-site technician, and/or the like.

Service agents are typically trained and guided using similar training materials and guidelines. However, service agents may differ in levels of experience, familiarity of associated products and/or services, knowledge of underlying technologies, and/or other factors. Correspondingly, certain service agents may recognize a cause of a technical issue and resolve the technical issue quicker than other service agents. For instance, a more experienced service agent may recognize a cause of a technical issue without performing one or more intermediate actions that may be suggested by corresponding guidelines and that may otherwise be performed by a less experienced service agent. Ideally, all service agents of a contact center should be trained to troubleshoot a technical issue in a consistent, efficient, and effective manner, such as a more experienced service agent would. This may involve having more experienced service agents manually train less experienced service agents, revising guidelines based on observations of the more experienced service agents, and/or the like. However, such practices may be time-consuming, inefficient, and impractical to effectively adapt to diverse and/or rapidly evolving products and/or services.

Some implementations described herein provide a dynamic sequencing platform that enables service agents of a contact center to more efficiently and effectively recognize a cause of an issue and resolve the issue. The dynamic sequencing platform may receive historical data (e.g., relating to a set of issues that were previously handled by the contact center, a set of actions that were performed to troubleshoot the issues, and a set of resolutions that resolved the issues), and receive real-time data (e.g., relating to an unresolved issue newly submitted by a consumer). The dynamic sequencing platform may use a machine learning model to analyze the historical data and identify an optimal resolution for the unresolved issue, and use a graph analytics model to analyze the historical data and identify an optimal path of actions that should be performed to efficiently and effectively achieve the optimal resolution. In some examples, such as when the machine learning model and/or the graph analytics model is unable to identify an optimal path of actions to perform, the dynamic sequencing platform may use a deep learning (neural network) model like the "long short-term memory" model to analyze the historical data and identify the optimal path of actions. Based on the optimal path of actions, the dynamic sequencing platform may identify and cause the next optimal action to be performed (e.g., via the service agent, the consumer, and/or an automated feature).

In this way, the dynamic sequencing platform enables a service agent to quickly identify a cause of an unresolved issue and resolve the issue irrespective of an experience level of the service agent. By providing efficient and effective resolutions, the dynamic sequencing platform maintains products and/or services being used by consumers in optimal operating conditions, reduces downtime, and increases productivity. By providing quicker resolutions to the consumers, the dynamic sequencing platform also reduces congestion of communication lines used by consumers to contact the service agents and conserves computational and/or networking resources that may otherwise be used to manage longer queues of consumer calls, chat requests, and/or the like. The dynamic sequencing platform additionally leverages a machine learning model and a graph analytics model, and/or a long short-term memory model to learn optimal paths of actions performed by more experienced service agents, guides less experienced service agents according to the optimal paths, and enables issues to be resolved in a consistent, efficient, and effective manner. Furthermore, the dynamic sequencing platform conserves time and resources that may otherwise be needed to learn from the more experienced service agents and train less experienced service agents.

FIGS. 1A-1D are diagrams of one or more example implementations 100 described herein. As shown in FIGS. 1A-1D, the example implementation(s) 100 may include a dynamic sequencing platform, a network storage device, and a client device. FIGS. 1A-1D present one or more functions that may be performed by the dynamic sequencing platform to identify an optimal path of actions to be performed as part of a troubleshooting service. For example, the dynamic sequencing platform may receive historical data and real-time data associated with the troubleshooting service, identify an optimal resolution based on the historical data and the real-time data, identify an optimal path of actions based on the optimal resolution and an unresolved issue identified by the real-time data, identify a next optimal action (e.g., a next best action) based on the optimal path and a prior action captured and/or denoted by the real-time data, and cause the next optimal action to be performed. The next optimal action may correspond to performing a diagnostic test, performing a restart, a reboot, and/or a reset, performing a firmware and/or a software update, checking and/or modifying a parameter, and/or performing another technical step or action intended to troubleshoot the unresolved issue. An action may be considered optimal when the action is associated with a set of actions that have been identified as an optimal path (e.g., a path with the fewest number of actions that lead to a resolution), and/or when the action otherwise has a greater likelihood of leading to a resolution (e.g., based on the historical data). The dynamic sequencing platform may use a machine learning model and a graph analytics model, and/or a long short-term memory model to analyze the historical data and identify the optimal path of actions. In some examples, one or more of the functions, described as being performed by the dynamic sequencing platform, may be performed by another device, such as the client device and/or the like.

In some implementations, the dynamic sequencing platform may be used in association with a troubleshooting service that is supported by the network storage device and/or the client device. For example, the troubleshooting service may include a suite of tools and/or applications that can be used by a service agent of a contact center to troubleshoot an issue (e.g., a technical issue associated with a product and/or a service) that is presented by a consumer. Among other things, the troubleshooting service may enable the service agent to receive real-time data relating to the issue experienced by the consumer, suggest a sequence of diagnostic actions to be performed to identify a cause of the issue and/or resolve the issue, and create a record (e.g., a trouble ticket) of the issue. The record may be stored in the network storage device and may include information identifying the consumer, the issue and/or a symptom experienced by the consumer, a product and/or a service associated with the issue, actions performed by the service agent, and a resolution of the issue (e.g., whether the issue was resolved by performing the suggested actions, sending a replacement device, dispatching an on-site technician, and/or the like). The service agent may access the troubleshooting service using a client device (e.g., a computer, and/or the like) that is connected to the dynamic sequencing platform over a wired connection and/or a wireless connection.

In some implementations, the troubleshooting service may include a suite of tools and/or applications that can be accessed and used by the consumer. For example, the troubleshooting service may provide an interactive user interface (e.g., a troubleshooting wizard, a chatbot, and/or the like) that is designed to enable the consumer to initiate a troubleshooting session, diagnose an issue with a product and/or a service, and resolve the issue without guidance by a service agent. During the troubleshooting session, the troubleshooting service may receive real-time data relating to the issue experienced by the consumer, suggest a sequence of diagnostic actions to perform to identify a cause of the issue and/or resolve the issue, and create a record of the issue. The record may be stored in the network storage device and include information identifying the consumer, the issue and/or the symptom experienced by the consumer, a product and/or a service associated with the issue, actions performed by the consumer, and a resolution of the issue. The consumer may be able to access the troubleshooting service using a client device that is connected to the dynamic sequencing platform over a wired connection and/or a wireless connection. In some examples, a product (e.g., a network device connected to the dynamic sequencing platform) may be configured to detect an issue and autonomously initiate a troubleshooting session to self-diagnose and/or resolve the issue.

As shown in FIG. 1A, and by reference number 110, the dynamic sequencing platform may receive historical data associated with a troubleshooting service from the network storage device. For example, the historical data may include information relating to a set of historical issues previously observed and handled by one or more service agents of a contact center, a set of historical actions performed in connection with the set of historical issues, and a set of historical resolutions associated with the set of historical issues. The historical data may be received as a set of records (e.g., trouble tickets and/or other types of electronic records) previously created by the service agents and/or submitted by consumers. In some examples, a record may include information identifying the service agent and/or the consumer associated with the record, information identifying one or more symptoms (e.g., a performance metric, an alarm, a notification, a response, and/or the like) exhibited by a product and/or a service associated with the record, and/or other relevant information. The records associated with the historical data may be sorted and/or indexed (e.g., according to issue type, product type, service type, sequence number, and/or another attribute) within the network storage device. In some examples, the dynamic sequencing platform may sort (e.g., in chronological order) and/or index the records upon receiving the historical data.

In some implementations, such as when the troubleshooting service relates to a network device and/or a network service, the historical data may include historical issues relating to network connectivity issues (e.g., unstable network connections, latent network connections, and/or the like) and/or network device issues (e.g., a hardware issue, a firmware issue, a software issue, and/or the like). Correspondingly, the historical data may include historical actions indicating whether a restart, a reboot, and/or a reset was performed, whether firmware and/or software was updated and/or installed, whether a parameter was checked and/or adjusted, and/or whether another action was performed to resolve the issue. The historical data may include historical resolutions indicating whether the issue was resolved remotely (e.g., by the service agent), whether the issue was resolved via a replacement device, whether the issue was resolved via dispatching an on-site technician for the consumer, whether the issue remains unresolved, and/or another final disposition. Although described herein in relation to network devices and/or network services, the dynamic sequencing platform may similarly be used with another troubleshooting service for another product and/or service, and/or in connection with another dynamic sequencing application.

As further shown in FIG. 1A, and by reference number 120, the dynamic sequencing platform may receive real-time data associated with the troubleshooting service from the client device. For example, the real-time data may correspond to new troubleshooting data that is received directly from a consumer and/or via a service agent. The real-time data may include information relating to an unresolved issue (e.g., an issue that is being experienced by the consumer) and/or one or more prior actions (e.g., one or more actions that have been performed by the consumer and/or by the service agent to resolve the unresolved issue. The real-time data may be received as a record (e.g., a trouble ticket and/or another type of electronic record) that is created by the service agent and/or submitted by the consumer. In some examples, the record associated with the real-time data may include information identifying the service agent and/or the consumer, information identifying one or more symptoms being exhibited by a product and/or a service associated with the record, and/or other relevant information that may be used to identify a resolution to the unresolved issue. The real-time data may include information relating to an issue type, a product type, a service type, a sequence number, and/or another attribute of the unresolved issue.

Figure 1B:
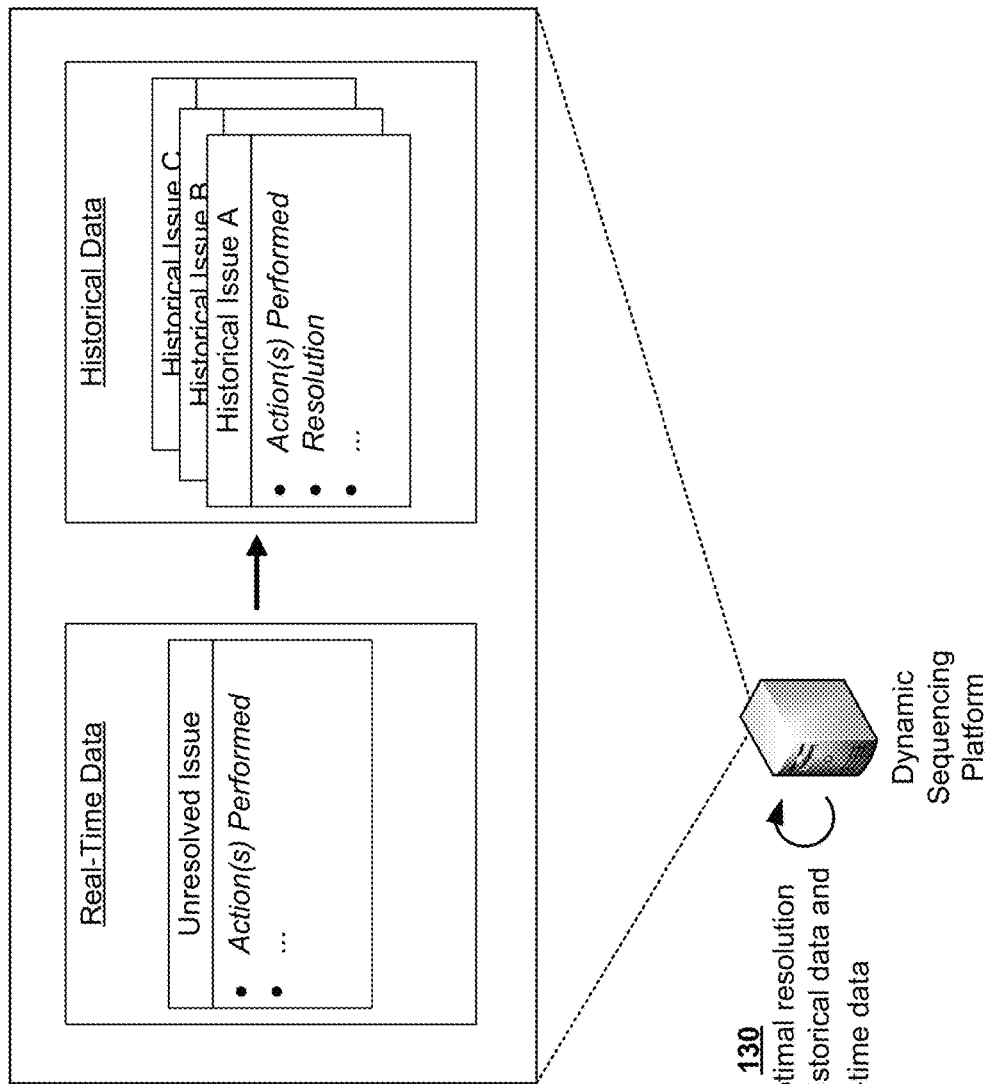

As shown in FIG. 1B, and by reference number 130, the dynamic sequencing platform may identify an optimal resolution based on the historical data and the real-time data. The dynamic sequencing platform may use a machine learning model to identify the optimal resolution based on the unresolved issue identified by the real-time data and the set of historical resolutions provided by the historical data. For example, the machine learning model (e.g., using a random forest and/or another classification technique) may be trained to identify a historical issue from the historical data that is similar to the unresolved issue, and identify the optimal resolution based on a historical resolution that was used to resolve the historical issue. In some examples, such as when different types of historical resolutions have been used to resolve the historical issue, the machine learning model may identify the optimal resolution based on the historical resolution most frequently used. In some examples, the real-time data may include additional information (e.g., a prior action that was performed by the service agent and/or the consumer, a performance metric, an alarm, a notification, a response, and/or the like). In such cases, the machine learning model may identify the optimal resolution based on a subset of the historical data most closely approximating the information contained in the real-time data (e.g., information corresponding to the unresolved issue and/or one or more prior actions that have been performed by the consumer and/or service agent).

Figure 1C:
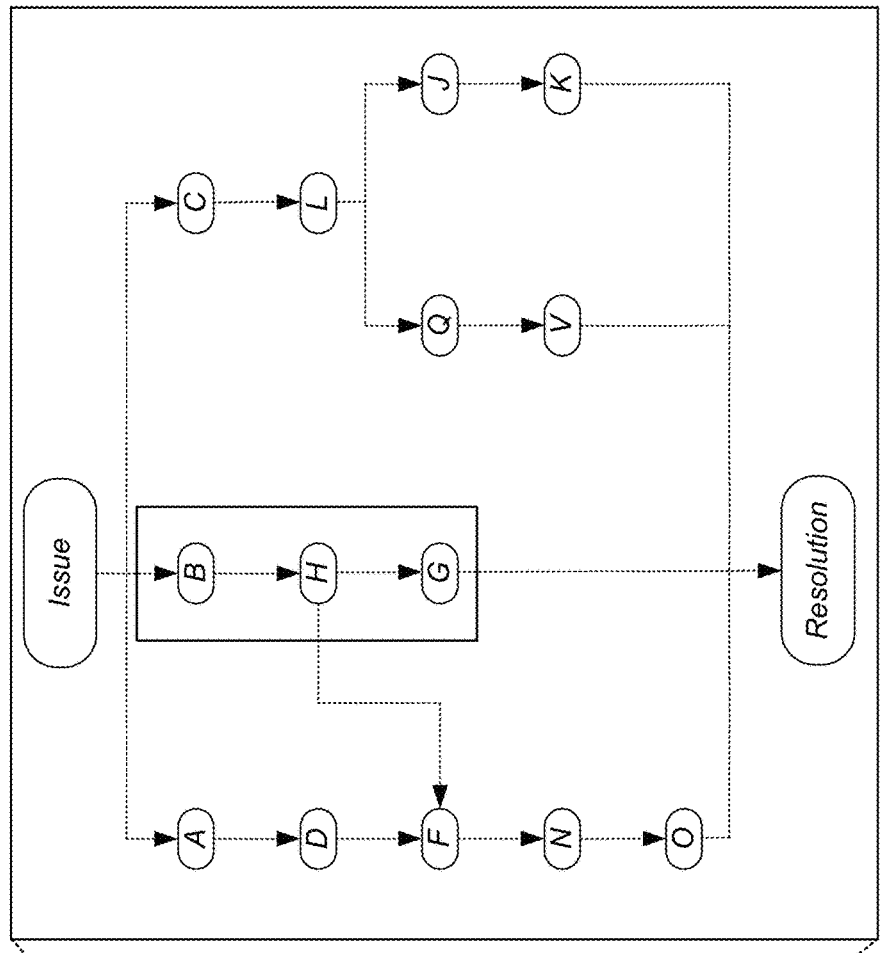

As shown in FIG. 1C, and by reference number 140, the dynamic sequencing platform may identify an optimal path of actions to be performed to resolve the unresolved issue specified by the consumer and achieve the optimal resolution identified by the machine learning model. The dynamic sequencing platform may use a graph analytics model to identify the optimal path. For example, the graph analytics model may be trained to generate an analytical graph based on the historical data. The analytical graph may include nodes (e.g., corresponding to historical issues, historical actions, and/or historical resolutions) that are interconnected by edges (e.g., corresponding to historical paths of actions). The edges of the analytical graph may be assigned respective weights that can be used to determine path length. For example, a weight of an edge may be determined based on a conditional probability (e.g., an action that should be performed based on the historical data and the real-time data given), a path length (e.g., a number of actions that were performed to achieve the optimal resolution), an accuracy (e.g., an efficacy of the actions in resolving a historical issue), and/or another factor. The graph analytics model may be trained to generate a set of paths of actions (e.g., path A-D-F-N-O, path B-H-F-N-O, path B-H-G, and/or the like) between a historical issue corresponding to the unresolved issue and the optimal resolution. The graph analytics model may be trained to identify a path (e.g., path B-H-G) having a least number of actions as the optimal path of actions. In some examples, the graph analytics model may be trained to determine and/or verify an efficacy of the optimal path of actions in resolving the unresolved issue (e.g., based on whether a consumer had contacted the contact center again within a threshold timeframe regarding the same issue and/or the like).

As further shown in FIG. 1C, and by reference number 150, the dynamic sequencing platform may identify an optimal action to be performed based on the unresolved issue and the optimal resolution. For example, the dynamic sequencing platform may use the graph analytics model to identify the optimal action based on the optimal path of actions (e.g., path B-H-G) previously identified. In some examples, such as when no prior action is indicated by the real-time data, the graph analytics model may be trained (e.g., using a domain-based heuristic rule and/or the like) to identify a first action (e.g., action B) of the optimal path of actions as the next optimal action to be performed by the service agent and/or the consumer. In some examples, such as when a prior action is indicated by the real-time data, the graph analytics model may be trained to identify the prior action within a sequence of actions associated with the optimal path, and identify an action that follows the prior action in the sequence of actions as the next optimal action to be performed by the service agent and/or the consumer. The graph analytics model may be trained to monitor the real-time data for an updated prior action (e.g., such as when the optimal action is performed and becomes the prior action in a subsequent iteration), and identify an updated optimal action based on an action that follows the prior action in the sequence of actions.

In some implementations, the machine learning model and/or the graph analytics model may be unable to identify an optimal path and/or an optimal action (e.g., the unresolved issue and/or one or more of the prior actions of the real-time data do not sufficiently correspond with the historical data). As shown for the example in FIG. 1C, prior actions (e.g., actions C and L) may produce a response that does not conform to the historical data and/or otherwise hinders an ability of the machine learning model and/or the graph analytics model to identify the optimal action. In such cases, the dynamic sequencing platform may determine an inconsistency between the unresolved issue, the prior action, the response, and/or the historical data, and use a long short-term memory model to identify the optimal action to be performed. The long short-term memory model may be trained to receive the historical data, identify one or more sets of historical actions (e.g., actions Q and J) that have been performed to resolve the historical issue, and identify the optimal action based on a statistical analysis of the historical actions. For example, the long short-term memory model may be trained to determine respective frequencies of the historical actions (e.g., a number of occurrences of the historical actions within the historical data), and identify the optimal action as the historical action most frequently used and associated with resolving the historical issue.

In some implementations, the long short-term memory model may use a neural network that is configured to store a varying number of historical actions within the historical data, and use the neural network to predict a probability of a subsequent action. For example, the long short-term memory model may be able to identify a sequence of actions indicated by a single record (e.g., a single trouble ticket) and/or a plurality of records (e.g., a plurality of trouble tickets) of the historical data, and predict a subsequent action based on the sequence of actions and the prior action indicated by the real-time data. In some examples, the long short-term memory model may be trained to identify a plurality of sequences of actions from the historical data, determine respective numbers of actions of the sequences, and determine a threshold number of actions (e.g., a median of the numbers of actions, a mean of the numbers of actions, and/or another threshold). The long short-term memory model may be trained to selectively limit analysis to records having fewer than the threshold number of actions to achieve a corresponding historical resolution, and cease the analysis upon reaching the historical resolution. In some examples, the long short-term memory model may be trained to compare a plurality of historical actions in terms of associated numbers of actions used to achieve the historical resolution, and identify the historical action associated with the fewest number of actions as the optimal action.

As described herein, the dynamic sequencing platform may use one or more artificial intelligence techniques, such as machine learning, deep learning, and/or the like, and one or more optimization techniques, such as graph analytics, to identify an optimal path of actions to be performed to resolve an issue with a product and/or a service.

In some implementations, the dynamic sequencing platform may parse natural language descriptions provided by the historical data and/or the real-time data (e.g., the trouble tickets and/or other records). For example, the dynamic sequencing platform may obtain data identifying, in natural language, a description of the historical issues, the historical actions, the historical resolutions, the unresolved issue, and/or the like, and may parse the data to identify the historical issues, the historical actions, the historical resolutions, the unresolved issue, and/or the like. In this way, the dynamic sequencing platform may identify characteristics associated with troubleshooting a product and/or a service, as described herein. Based on applying a rigorous and automated process associated with identifying an optimal path of actions and/or an optimal action for troubleshooting an issue, the dynamic sequencing platform may be able to recognize and/or identify up to thousands or millions of optimal paths of actions for thousands or millions of records of historical data, and thereby increase an accuracy and consistency of identifying optimal paths of actions, relative to requiring computing resources to be allocated for hundreds or thousands of technicians to manually identify optimal paths of actions based on the thousands or millions of records of historical data.

In some implementations, the dynamic sequencing platform may perform a data preprocessing operation when generating the machine learning model, the graph analytics model, and/or the long short-term memory model. For example, the dynamic sequencing platform may preprocess data (e.g., the historical data and/or the real-time data, and/or the like) to remove non-ASCII characters, white spaces, confidential data, personal information, personally identifying information, and/or the like. In this way, the dynamic sequencing platform may organize thousands or millions of data items for machine learning and model generation.

In some implementations, the dynamic sequencing platform may perform a training operation when generating the machine learning model, the graph analytics model, and/or the long short-term memory model. For example, the dynamic sequencing platform may portion the historical data and/or the real-time data into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the dynamic sequencing platform may preprocess and/or perform feature engineering and extraction to enhance the quality of information provided by the historical data and/or the real-time data and provide an enhanced feature set. In some implementations, the dynamic sequencing platform may train the machine learning model, the graph analytics model, and/or the long short-term memory model on this enhanced feature set.

In some implementations, the dynamic sequencing platform may use a classification technique, such as a logistic regression classification technique, a random forest classification technique, a gradient boosting machine learning (GBM) technique, and/or the like, to determine a categorical outcome (e.g., that an issue was resolved during a troubleshooting session, that an issue was resolved by dispatching an on-site technician, or the like). Additionally, or alternatively, the dynamic sequencing platform may use a naïve Bayesian classifier technique. In this case, the dynamic sequencing platform may perform binary recursive partitioning to split the data of the minimum feature set into partitions and/or branches and use the partitions and/or branches to perform predictions (e.g., that an issue was resolved by dispatching an on-site technician). Based on using recursive partitioning, the dynamic sequencing platform may reduce utilization of computing resources relative to manual, linear sorting and analysis of data items, thereby enabling use of thousands, millions, of data items to train a model, which may result in a more accurate model than using fewer data items.

As another example, the dynamic sequencing platform may determine, using a linear regression technique, that a threshold percentage of historical actions, in a set of historical actions, are not optimal in resolving an associated issue, and may determine that those historical actions are to receive relatively low association scores. In contrast, the dynamic sequencing platform may determine that another threshold percentage of historical actions are optimal in resolving an associated issue and may assign a relatively high association score to those historical actions. Based on the characteristics of the historical actions being optimal or not, the dynamic sequencing platform may generate a model (e.g., the machine learning model, the graph analytics model, the long short-term memory model, and/or the like), and may use the model for analyzing new actions, and/or the like) that the dynamic sequencing platform identifies.

In some implementations, the dynamic sequencing platform may train the machine learning model, the graph analytics model, and/or the long short-term memory model based on historical data intermittently and/or periodically within an offline environment of the network storage device and/or the like. In some examples, an output of the machine learning model, the graph analytics model, and/or the long short-term memory model may be provided to a cloud-based, on-premise, and/or another data structure and configured to process an unresolved issue in real-time. In some examples, a different device, such as a server device, may generate and train the machine learning model, the graph analytics model, and/or the long short-term memory model. The different device may send the machine learning model, the graph analytics model, and/or the long short-term memory model to the dynamic sequencing platform, for use by the dynamic sequencing platform. The different device may update and send (e.g., on a scheduled basis, on an on-demand basis, on a triggered basis, on a periodic basis, and/or the like) the machine learning model, the graph analytics model, and/or the long short-term memory model to the dynamic sequencing platform.

Accordingly, the dynamic sequencing platform may use any number of artificial intelligence techniques, machine learning techniques, deep learning techniques, and/or the like to identify an optimal path of actions and/or an optimal action to be performed to resolve an unresolved issue.

Figure 1D:
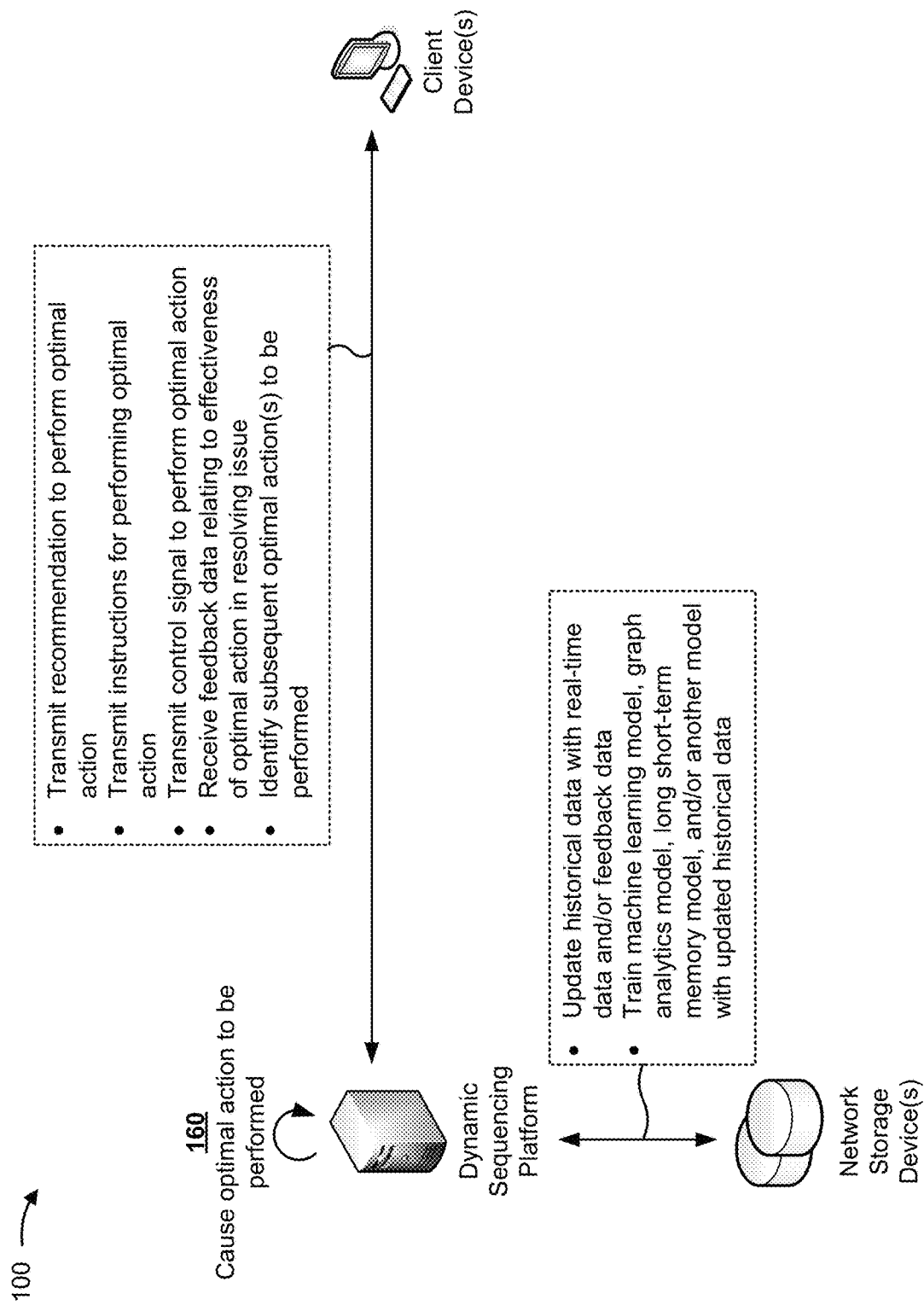

As shown in FIG. 1D, and by reference number 160, the dynamic sequencing platform may cause the optimal action to be performed. For example, the dynamic sequencing platform may generate a recommendation and/or an instruction to perform the optimal action, and transmit the recommendation and/or the instruction to the service agent and/or the consumer via the client device. Additionally, or alternatively, the dynamic sequencing platform may provide the service agent and/or the consumer with the recommendation and/or the instruction to perform the optimal action or a set of optimal actions, and present statistics associated with the optimal action or the set of optimal actions (e.g., respective efficacies of the optimal actions in resolving the unresolved issue, respective frequencies of the optimal actions within the historical data, and/or the like).

In some implementations, such as when the unresolved issue relates to a network device and/or another device with network connectivity, the dynamic sequencing platform may directly control the network device (e.g., using a network command) to perform the optimal action, and monitor a response to the optimal action provided by the network device. In some examples, the dynamic sequencing platform may be configured to distinguish between intrusive and non-intrusive network commands. A network command may be intrusive if execution of the network command may disrupt a call or another mode of communication between a consumer and a service agent that is being used to troubleshoot an unresolved issue, and/or otherwise requires acknowledgement from the consumer prior to executing the network command. If the network command is intrusive, the dynamic sequencing platform may enable the service agent to temporarily pause a process of the dynamic sequencing platform and obtain the acknowledgement from the consumer. If the network command is non-intrusive, the dynamic sequencing platform may automatically execute the network command to perform the optimal action.

In some implementations, the dynamic sequencing platform may receive feedback data (e.g., a performance metric, an alarm, a notification, a response, and/or the like) relating to an efficacy of the optimal action in resolving the unresolved issue, and update the historical data based on the feedback data. In some examples, the dynamic sequencing platform may transmit the feedback data and/or the real-time data to the network storage device, and update the historical data with the feedback data and/or the real-time data. In some cases, the dynamic sequencing platform may train the machine learning model, the graph analytics model, and/or the long short-term memory model based on the updated historical data (e.g., historical data that has been updated with the feedback data and/or the real-time data).

In this way, the dynamic sequencing platform enables a service agent to quickly identify a cause of an unresolved issue and resolve the issue irrespective of an experience level of the service agent. For example, the dynamic sequencing platform may use the machine learning model (e.g., using a random forest and/or another classification technique) to identify the optimal resolution based on the unresolved issue. Once the optimal resolution has been identified, the dynamic sequencing platform may use the graph analytics model to identify the optimal (e.g., shortest) path of actions to perform to achieve the optimal resolution. If the real-time data indicates an unanticipated response (e.g., a response that is inconsistent with the historical data and/or the optimal path identified by the graph analytics model), the dynamic sequencing platform may use the long short-term memory model and/or a related deep-learning model to identify the next optimal action to be performed.

Accordingly, by leveraging the machine learning model, the graph analytics model, and/or the long short-term memory model, the dynamic sequencing platform learns optimal paths of actions performed by more experienced service agents, guides less experienced service agents according to the optimal paths, and enables issues to be resolved in a consistent, efficient, and effective manner. The dynamic sequencing platform also conserves time and resources that may otherwise be needed from the more experienced service agents to train less experienced service agents. By providing efficient and effective resolutions, the dynamic sequencing platform maintains products and/or services being used by consumers in optimal operating conditions, reduces downtime, and increases productivity. Furthermore, by providing quicker resolutions to the consumers, the dynamic sequencing platform also reduces congestion of communication lines used by consumers to contact the service agents, and conserves computational and/or networking resources that may otherwise be used to manage longer queues of consumer calls, chat requests, and/or the like.

As indicated above, FIGS. 1A-1D are provided as one or more examples. Other examples can differ from what is described with regard to FIGS. 1A-1D.

Figure 2:
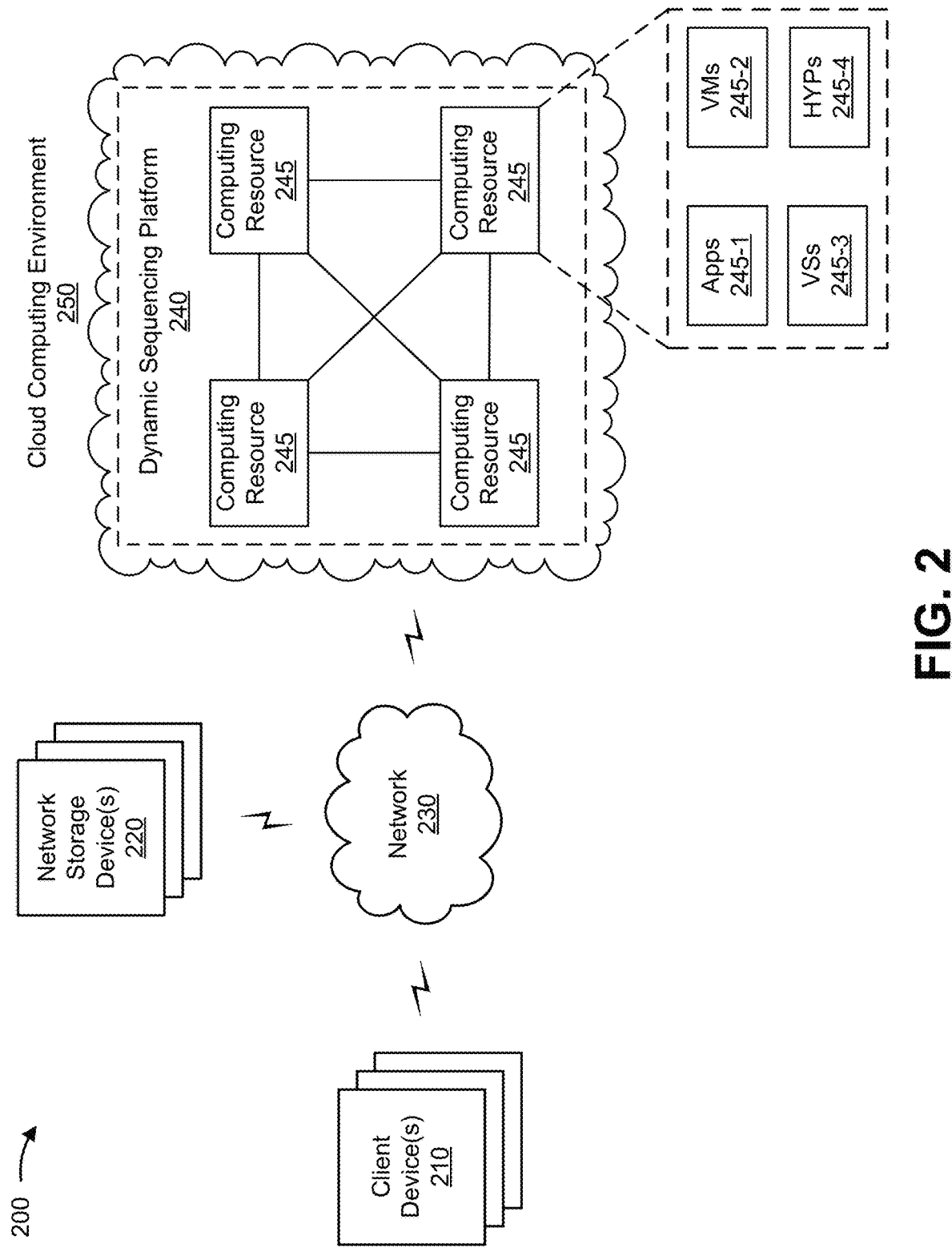
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210 (referred to herein individually as client device 210 and collectively as client devices 210), one or more network storage devices 220 (referred to herein individually as network storage device 220 and collectively as network storage devices 220), network 230, dynamic sequencing platform 240, computing resource 245, and cloud computing environment 250. Devices of environment 200 may interconnect via wired connections, wireless connections, or a combination of wired and wireless connections.

Client device 210 includes one or more devices capable of receiving, generating, storing, processing, and/or providing information associated with identifying an optimal path of actions and/or an optimal action of a dynamic sequence (e.g., in association with a troubleshooting service and/or the like). For example, client device 210 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network storage device 220 includes one or more devices capable of storing, processing, and/or routing information. Network storage device 220 may include, for example, a server device, a device that stores a data structure, a device in a cloud computing environment or a data center, a device in a core network of a network operator, a network controller, and/or the like. In some implementations, network storage device 220 may include a communication interface that allows network storage device 220 to receive information from and/or transmit information to other devices in environment 200, such as client device 210, dynamic sequencing platform 240, and/or the like.

Network 230 includes one or more wired and/or wireless networks. For example, network 230 may include a cellular network (e.g., a long-term evolution (LTE) network, a code division multiple access (CDMA) network, a 2G network, a 3G network, a 4G network, a 5G network, a New Radio (NR) network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Dynamic sequencing platform 240 includes one or more computing devices configured to identify an optimal path of actions and/or an optimal action of a dynamic sequence (e.g., in association with a troubleshooting service and/or the like). In some implementations, dynamic sequencing platform 240 may receive historical data and real-time data associated with a troubleshooting service, identify an optimal resolution based on the historical data and the real-time data, identify an optimal path of actions and/or an optimal action to perform based on the optimal resolution and an unresolved issue indicated by the real-time data, and cause the optimal action to be performed. In some implementations, dynamic sequencing platform 240 may be designed to be modular such that certain software components may be swapped in or out depending on a particular need. As such, dynamic sequencing platform 240 may be easily and/or quickly reconfigured for different uses. In some implementations, dynamic sequencing platform 240 may receive information from and/or transmit information to client device 210, network storage device 220, and/or the like.

In some implementations, dynamic sequencing platform 240 may include a server device or a group of server devices. In some implementations, dynamic sequencing platform 240 may be hosted in cloud computing environment 250. Notably, while implementations described herein describe dynamic sequencing platform 240 as being hosted in cloud computing environment 250, in some implementations, dynamic sequencing platform 240 may be non-cloud-based or may be partially cloud-based.

Cloud computing environment 250 includes an environment that delivers computing as a service, whereby shared resources, services, and/or the like may be provided to client device 210, network storage device 220, and/or the like. Cloud computing environment 250 may provide computation, software, data access, storage, and/or other services that do not require end-user knowledge of a physical location and configuration of a system and/or a device that delivers the services. As shown, cloud computing environment 250 may include dynamic sequencing platform 240 and computing resource 245.

Computing resource 245 includes one or more server devices, or another type of computation and/or communication device. In some implementations, computing resource 245 may host dynamic sequencing platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections (e.g., via an Ethernet interface and/or the like), wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by client device 210. Application 245-1 may eliminate a need to install and execute the software applications on client device 210. For example, application 245-1 may include software associated with dynamic sequencing platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., client device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
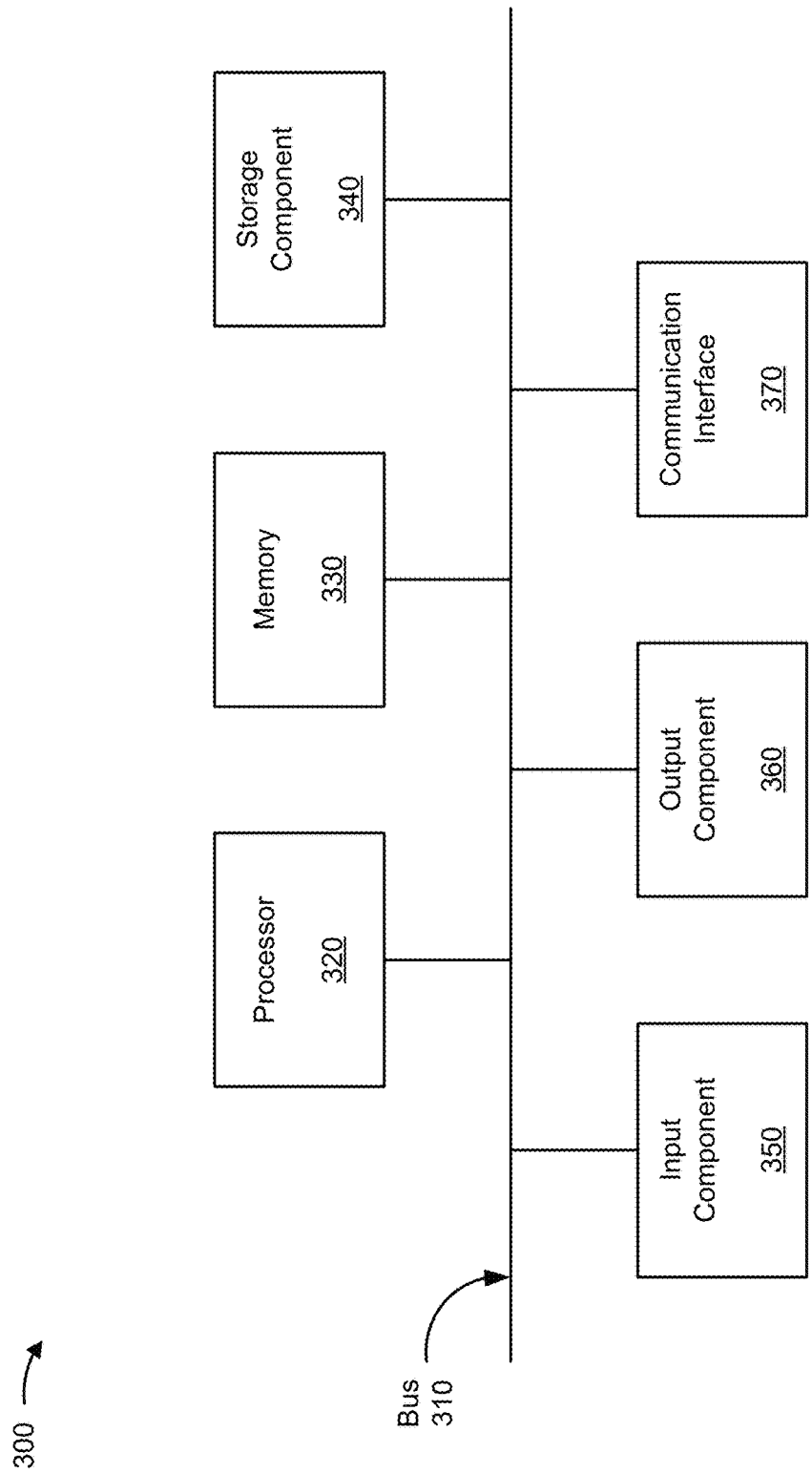
FIG. 3 is a diagram of example components of one or more devices of FIG. 2.

FIG. 3 is a diagram of example components of a device 300. Device 300 may correspond client device 210, network storage device 220, dynamic sequencing platform 240, and/or computing resource 245. In some implementations, client device 210, network storage device 220, dynamic sequencing platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for identifying an optimal path of actions of a dynamic sequence. In some implementations, one or more process blocks of FIG. 4 may be performed by a dynamic sequencing platform (e.g., dynamic sequencing platform 240). In some implementations, one or more process blocks of FIG. 4 may be performed by another device or a group of devices separate from or including the dynamic sequencing platform, such as a client device (e.g., client device 210) and/or a network storage device (e.g., network storage device 220).

As shown in FIG. 4, process 400 may include receiving data associated with a troubleshooting service (block 410). For example, the dynamic sequencing platform (e.g., using processor 320, memory 330, storage component 340, input component 350, output component 360, communication interface 370, and/or the like) may receive historical data and real-time data associated with a troubleshooting service, as described above. In some aspects, the historical data may include information relating to a set of historical issues, a set of historical actions associated with the set of historical issues, and a set of historical resolutions associated with the set of historical issues. In some aspects, the real-time data may include information relating to an unresolved issue and a prior action performed in connection with the unresolved issue.

As further shown in FIG. 4, process 400 may include identifying an optimal resolution based on the data (block 420). For example, the dynamic sequencing platform (e.g., using processor 320, memory 330, storage component 340, input component 350, output component 360, communication interface 370, and/or the like) may identify, using a machine learning model, an optimal resolution based on the historical data and the real-time data, as described above. In some aspects, the machine learning model may be trained to identify one of the set of historical issues associated with the unresolved issue, and identify the optimal resolution based on one of the set of historical resolutions associated with the one of the set of historical issues.

As further shown in FIG. 4, process 400 may include identifying an optimal action to be performed based on the optimal resolution (block 430). For example, the dynamic sequencing platform (e.g., using processor 320, memory 330, storage component 340, input component 350, output component 360, communication interface 370, and/or the like) may identify, using a graph analytics model, an optimal action to be performed based on the unresolved issue and the optimal resolution, as described above. In some aspects, the graph analytics model may be trained to generate a set of paths of actions between the unresolved issue and the optimal resolution based on the historical data, identify an optimal path of actions based on respective numbers of actions associated with the set of paths, and identify the optimal action based on the optimal path and the prior action.

As further shown in FIG. 4, process 400 may include causing the optimal action to be performed (block 440). For example, the dynamic sequencing platform (e.g., using processor 320, memory 330, storage component 340, input component 350, output component 360, communication interface 370, and/or the like) may cause the optimal action to be performed, as described above. In some aspects, the optimal action may correspond to performing a diagnostic test, performing a restart, a reboot, and/or a reset, performing a firmware and/or a software update, checking and/or modifying a parameter, and/or performing another technical step or action intended to identify a cause of the unresolved issue and/or resolve the unresolved issue. The optimal action may be an action that the service agent can perform remotely from the contact center, an action that the service agent can instruct the consumer to perform locally, and/or the like. In some examples, process 400 may generate a recommendation and/or an instruction to perform the optimal action, and transmit the recommendation and/or the instruction to the service agent and/or the consumer via the client device. Additionally, or alternatively, process 400 may provide the service agent and/or the consumer with the recommendation and/or the instruction to perform the optimal action or a set of optimal actions, and present statistics associated with the optimal action or the set of optimal actions (e.g., respective efficacies of the optimal actions in resolving the unresolved issue, respective frequencies of the optimal actions within the historical data, and/or the like).

In some implementations, such as when the unresolved issue relates to a network device and/or another device with network connectivity, process 400 may directly control the network device to perform the optimal action, and monitor a response to the optimal action provided by the network device. Process 400 may receive feedback data (e.g., a performance metric, an alarm, a notification, a response, and/or the like) relating to an efficacy of the optimal action in resolving the unresolved issue, and update the machine learning model, the graph analytics model, and/or the long short-term memory model based on the feedback data. In some examples, process 400 may transmit the feedback data and/or the real-time data to the network storage device, and update the historical data with the feedback data and/or the real-time data. In some cases, process 400 may train the machine learning model, the graph analytics model, and/or the long short-term memory model based on the updated historical data (e.g., historical data updated with the feedback data and/or the real-time data. Once the optimal action has been performed, and if the unresolved issue persists, process 400 may return one of preceding blocks (e.g., block 420) to identify an updated optimal resolution, identify an updated optimal action, and cause the updated optimal action to be performed. Process 400 may continue in such a way until the unresolved issue is resolved.

Process 400 may include additional implementations, such as any single implementation or any combination of implementations described below and/or in connection with one or more other processes described elsewhere herein.

In a first implementation, identifying the optimal resolution comprises identifying, using a random forest machine learning model, the optimal resolution. The random forest machine learning model may be trained to identify the one of the set of historical issues associated with the unresolved issue. The random forest machine learning model may identify the set of historical actions and the set of historical resolutions associated with the one of the set of historical issues associated with the unresolved issue. The random forest machine learning model may identify the optimal resolution from the set of historical resolutions based on a correspondence between the set of historical actions and the prior action.

In a second implementation, alone or in combination with the first implementation, identifying the optimal action comprises identifying, using the graph analytics model, the optimal action. The graph analytics model may be trained to generate the set of paths of actions between the unresolved issue and the optimal resolution based on the historical data, determine the respective numbers of actions associated with the set of paths, identify one of the set of paths having a least number of actions as the optimal path of actions, and identify the optimal action based on the optimal path and the prior action.

In a third implementation, alone or in combination with one or more of the first and second implementations, process 400 may further comprise determining an inconsistency between one or more of the unresolved issue, the prior action, a response to the optimal action, or the historical data, and identifying, using a long short-term memory model, a subsequent action to be performed based on determining the inconsistency. The long short-term memory model may be trained to receive the historical data, identify one of the set of historical issues associated with the unresolved issue, identify the set of historical actions associated with the one of the set of historical issues, determine respective frequencies of the set of historical actions, and identify the subsequent action based on the respective frequencies of the set of historical actions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, historical data and real-time data associated with a troubleshooting service,
      wherein the historical data includes information relating to a set of historical issues, a set of historical actions associated with the set of historical issues, and a set of historical resolutions associated with the set of historical issues, and
      wherein the real-time data includes information relating to an unresolved issue and a prior action performed in connection with the unresolved issue;
   identifying, by the device and using a machine learning model, an optimal resolution based on the historical data and the real-time data,
      wherein the machine learning model is trained to identify one of the set of historical issues related to the unresolved issue, and identify the optimal resolution based on one of the set of historical resolutions associated with the one of the set of historical issues;
   identifying, by the device and using a graph analytics model, an optimal action to be performed based on the unresolved issue and the optimal resolution,
      wherein the graph analytics model is trained to generate a set of paths of actions between the unresolved issue and the optimal resolution based on the historical data, identify an optimal path of actions based on respective numbers of actions associated with the set of paths, and identify the optimal action based on the optimal path and the prior action, and
      wherein edges of an analytical graph, associated with the set of paths, are assigned respective weights to determine path length of the set of paths; and
   causing, by the device, the optimal action to be performed and one or more of the machine learning model or the graph analytics model to be updated based on the real-time data.

2. The method of claim 1, wherein identifying the optimal resolution comprises:
   identifying, using a random forest machine learning model, the optimal resolution,
      wherein the random forest machine learning model is trained to identify the one of the set of historical issues similar to the unresolved issue, identify the set of historical actions and the set of historical resolutions associated with the one of the set of historical issues associated with the unresolved issue, and identify the optimal resolution from the set of historical resolutions based on a correspondence between the set of historical actions and the prior action.

3. The method of claim 1, wherein identifying the optimal action comprises:
identifying, using the graph analytics model, the optimal path of actions,
wherein the graph analytics model is trained to generate the set of paths of actions between the unresolved issue and the optimal resolution based on the historical data, determine the respective numbers of actions associated with the set of paths, identify one of the set of paths having a least number of actions as the optimal path of actions, and identify the optimal action based on the optimal path and the prior action.

4. The method of claim 1, wherein causing the optimal action to be performed comprises:
generating a recommendation to perform the optimal action.

5. The method of claim 1, wherein causing the optimal action to be performed comprises:
controlling one or more network devices to perform the optimal action.

6. The method of claim 1, further comprising:
determining an inconsistency between one or more of the unresolved issue, the prior action, a response to the optimal action, or the historical data; and
identifying, using a long short-term memory model, a subsequent action to be performed based on determining the inconsistency,
wherein the long short-term memory model is trained to receive the historical data, identify one of the set of historical issues associated with the unresolved issue, identify the set of historical actions associated with the one of the set of historical issues, determine respective frequencies of the set of historical actions, and identify the subsequent action based on the respective frequencies of the set of historical actions.

7. A device, comprising:
one or more processors configured to:
receive historical data and real-time data associated with a troubleshooting service,
wherein the historical data includes information relating to a set of historical issues, a set of historical actions associated with the set of historical issues, and a set of historical resolutions associated with the set of historical issues, and
wherein the real-time data includes information relating to an unresolved issue and a prior action performed in connection with the unresolved issue;
identify, using a machine learning model, an optimal resolution based on the historical data and the real-time data,
wherein the machine learning model is trained to identify one of the set of historical issues related to the unresolved issue, and identify the optimal resolution based on one of the set of historical resolutions associated with the one of the set of historical issues;
identify, using a graph analytics model, an optimal path of actions between the unresolved issue and the optimal resolution,
wherein the graph analytics model is trained to generate a set of paths of actions between the unresolved issue and the optimal resolution based on the historical data, and identify the optimal path based on respective numbers of actions associated with the set of paths, and
wherein edges of an analytical graph, associated with the set of paths, are assigned respective weights to determine path length of the set of paths;
identify an optimal action based on the optimal path and the prior action; and
cause the optimal action to be performed and one or more of the machine learning model or the graph analytics model to be updated based on the real-time data.

8. The device of claim 7, wherein the one or more processors, when identifying the optimal resolution, are configured to:
identify, using a random forest machine learning model, the optimal resolution,
wherein the random forest machine learning model is trained to identify the one of the set of historical issues associated with the unresolved issue, identify the set of historical actions and the set of historical resolutions associated with the one of the set of historical issues associated with the unresolved issue, and identify the optimal resolution from the set of historical resolutions based on a correspondence between the set of historical actions and the prior action.

9. The device of claim 7, wherein the one or more processors, when identifying the optimal path of actions, are configured to:
identify, using the graph analytics model, the optimal path of actions,
wherein the graph analytics model is trained to generate the set of paths of actions between the unresolved issue and the optimal resolution based on the historical data, and identify one of the set of paths having a sequence of actions including the prior action as the optimal path.

10. The device of claim 7, wherein the one or more processors, when identifying the optimal action, are configured to:
identify a sequence of actions based on the optimal path; and
identify an action that follows the prior action in the sequence of actions as the optimal action.

11. The device of claim 7, wherein the one or more processors are further configured to:
receive feedback data relating to an efficacy of the optimal action in resolving the unresolved issue; and
update one or more of the machine learning model or the graph analytics model based on the feedback data.

12. The device of claim 7, wherein the one or more processors are further configured to:
determine an inconsistency between one or more of the unresolved issue, the prior action, a response to the optimal action, or the historical data; and
identify, using a long short-term memory model, a subsequent action to be performed based on determining the inconsistency,
wherein the long short-term memory model is trained to receive the historical data, identify one of the set of historical issues associated with the unresolved issue, identify the set of historical actions associated with the one of the set of historical issues and having a threshold number of actions, determine respective frequencies of the set of historical actions, and identify the subsequent action based on the respective frequencies of the set of historical actions.

13. A non-transitory computer-readable medium storing instructions, the instructions comprising:

one or more instructions that, when executed by one or more processors, cause the one or more processors to:
receive historical data associated with a troubleshooting service,
wherein the historical data includes information relating to a set of historical issues, a set of historical actions associated with the set of historical issues, and a set of historical resolutions associated with the set of historical issues;
receive real-time data associated with the troubleshooting service,
wherein the real-time data includes information relating to an unresolved issue and a prior action performed in connection with the unresolved issue;
identify, using a machine learning model, an optimal resolution based on the historical data and the real-time data,
wherein the machine learning model is trained to identify one of the set of historical issues related to the unresolved issue, and identify the optimal resolution based on one of the set of historical resolutions associated with the one of the set of historical issues;
identify, using a graph analytics model, an optimal action to be performed based on the unresolved issue and the optimal resolution,
wherein the graph analytics model is trained to generate a set of paths of actions between the unresolved issue and the optimal resolution based on the historical data, identify an optimal path of actions based on respective numbers of actions associated with the set of paths, and identify the optimal action based on the optimal path and the prior action, and
wherein edges of an analytical graph, associated with the set of paths, are assigned respective weights to determine path length of the set of paths; and
cause the optimal action to be performed and one or more of the machine learning model or the graph analytics model to be updated based on the real-time data.

14. The non-transitory computer-readable medium of claim 13, wherein the one or more instructions, that cause the one or more processors to receive the historical data, cause the one or more processors to:
receive the historical data as a set of records associated with a network troubleshooting service,
wherein the set of historical issues includes information relating to one or more of a network device issue or a network connectivity issue, and
wherein the set of historical resolutions includes information relating to one or more of a resolution via a remote service, a resolution via a device replacement, or a resolution via on-site service.

15. The non-transitory computer-readable medium of claim 13, wherein the one or more instructions, that cause the one or more processors to identify the optimal resolution, cause the one or more processors to:
identify, using a random forest machine learning model, the optimal resolution,
wherein the random forest machine learning model is trained to identify the one of the set of historical issues associated with the unresolved issue, identify the set of historical actions and the set of historical resolutions associated with the one of the set of historical issues associated with the unresolved issue, and identify the optimal resolution from the set of historical resolutions based on a correspondence between the set of historical actions and the prior action.

16. The non-transitory computer-readable medium of claim 13, wherein the one or more instructions, that cause the one or more processors to identify the optimal action, cause the one or more processors to:
identify, using the graph analytics model, the optimal action,
wherein the graph analytics model is trained to generate the set of paths of actions between the unresolved issue and the optimal resolution based on the historical data, determine the respective numbers of actions associated with the set of paths, identify one of the set of paths having a least number of actions as the optimal path of actions, and identify the optimal action based on the optimal path and the prior action.

17. The non-transitory computer-readable medium of claim 13, wherein the one or more instructions, that cause the one or more processors to cause the optimal action to be performed, cause the one or more processors to:
generate a recommendation to perform the optimal action.

18. The non-transitory computer-readable medium of claim 13, wherein the one or more instructions, that cause the one or more processors to cause the optimal action to be performed, cause the one or more processors to:
control one or more network devices to perform the optimal action.

19. The non-transitory computer-readable medium of claim 13, wherein the one or more instructions, when executed by the one or more processors, further cause the one or more processors to:
receive feedback data relating to an efficacy of the optimal action in resolving the unresolved issue; and
update one or more of the machine learning model or the graph analytics model based on the feedback data.

20. The non-transitory computer-readable medium of claim 13, wherein the one or more instructions, when executed by the one or more processors, further cause the one or more processors to:
determine an inconsistency between one or more of the unresolved issue, the prior action, a response to the optimal action, or the historical data; and
identify, using a long short-term memory model, a subsequent action to be performed based on determining the inconsistency,
wherein the long short-term memory model is trained to receive the historical data, identify one of the set of historical issues related to the unresolved issue, identify the set of historical actions associated with the one of the set of historical issues, determine respective frequencies of the set of historical actions, and identify the subsequent action based on the respective frequencies of the set of historical actions.

* * * * *